(12) United States Patent
Joffre

(10) Patent No.: US 9,308,999 B2
(45) Date of Patent: Apr. 12, 2016

(54) AIRCRAFT BENCH PROVIDED WITH CRASH-PROTECTION MEANS

(71) Applicant: AIRBUS HELICOPTERS, Marignane, Cedex (FR)

(72) Inventor: Jean-Francois Joffre, Carry le Rouet (FR)

(73) Assignee: Airbus Helicopters, Marignane (FR)

( * ) Notice: Subject to any disclaimer, the term of this patent is extended or adjusted under 35 U.S.C. 154(b) by 67 days.

(21) Appl. No.: 13/776,912

(22) Filed: Feb. 26, 2013

(65) Prior Publication Data

US 2013/0228652 A1 Sep. 5, 2013

(30) Foreign Application Priority Data

Mar. 1, 2012 (FR) ..................................... 12 00616

(51) Int. Cl.
*B64D 11/06* (2006.01)
*B64D 25/04* (2006.01)

(52) U.S. Cl.
CPC ........ *B64D 11/0696* (2013.01); *B64D 11/0619* (2014.12); *B64D 25/04* (2013.01); *B64D 11/0689* (2013.01); *Y02T 50/46* (2013.01)

(58) Field of Classification Search
CPC ........... B64D 11/0696; B64D 2011/06; B64D 2011/0627; B60N 2/01508; B60N 2/01533; B60N 2/01541; B60N 2/4242; B60N 2/504
USPC .......... 244/118.6, 122 R; 297/14, 15, 216.13, 297/216.17, 216.18, 344.12, 344.14, 297/344.18, 344.19, 452.11, 452.12, 297/452.17, 452.19, 331, 334, 337, 332, 297/333, 464–465, 468–480, 483–484, 297/486–488, 216.1–216.2, 273, 248
See application file for complete search history.

(56) References Cited

U.S. PATENT DOCUMENTS 3,139,304 A * 6/1964 Lehner et al. ................. 297/308
3,868,143 A * 2/1975 Reilly ...................... 297/216.17
4,358,154 A    11/1982 Campbell
4,423,848 A *  1/1984 Mazelsky .................. 244/122 R
(Continued)

FOREIGN PATENT DOCUMENTS

DE    102007011962 B3    2/2008
EP       0065982 A1    12/1982
(Continued)

OTHER PUBLICATIONS

Search Report and Written Opinion; FR 1200616; dated Dec. 11, 2012.

*Primary Examiner* — Tien Dinh
*Assistant Examiner* — Christopher Hutchens
(74) *Attorney, Agent, or Firm* — Brooks Kushman P.C.

(57) ABSTRACT

A crashworthy bench (1) for an aircraft having a cabin that includes a floor (51), a ceiling (52), and substantially vertical partitions. Said bench (1) comprises a frame (2), at least one seat for a passenger, with each seat comprising a seat, a back, a retaining system (7) for retaining said passenger, and at least one energy absorber device (20). Said frame (2) is fastened to the inside of said cabin via one low connection point (8) for each seat and via at least one high connection point (9) for said bench (1). Two low connecting rods (11) and one leg (12) connect the frame (2) to each low connection point (8) on said floor (51). Two high connecting rods (15) connect the frame (2) to the high connection points (9) on said ceiling (52) or on a vertical partition of the cabin of the aircraft.

20 Claims, 4 Drawing Sheets

(56) References Cited

U.S. PATENT DOCUMENTS

| | | | |
|---|---|---|---|
| 4,525,010 A * | 6/1985 | Trickey et al. | 297/216.17 |
| 5,692,705 A * | 12/1997 | Bellais | 244/122 R |
| 6,152,401 A | 11/2000 | Green | |
| 6,742,838 B1 * | 6/2004 | Swierczewski | 297/216.1 |
| 7,938,485 B1 * | 5/2011 | Perciballi et al. | 297/216.1 |
| 8,087,723 B2 | 1/2012 | Honnorat | |
| 8,678,465 B1 * | 3/2014 | Aragon et al. | 296/68.1 |
| 2006/0237586 A1 * | 10/2006 | Barackman et al. | 244/118.6 |
| 2009/0267391 A1 | 10/2009 | Honnorat | |
| 2010/0117408 A1 | 5/2010 | Hansen | |
| 2012/0200128 A1 * | 8/2012 | Soliz | 297/216.17 |

FOREIGN PATENT DOCUMENTS

| | | |
|---|---|---|
| EP | 0099677 B1 | 3/1988 |
| FR | 2389045 A1 | 11/1978 |
| FR | 2930520 A1 | 10/2009 |
| FR | 2930613 A1 | 10/2009 |
| FR | 2962714 A1 | 1/2012 |
| WO | WO 03004958 A2 * | 1/2003 |

* cited by examiner

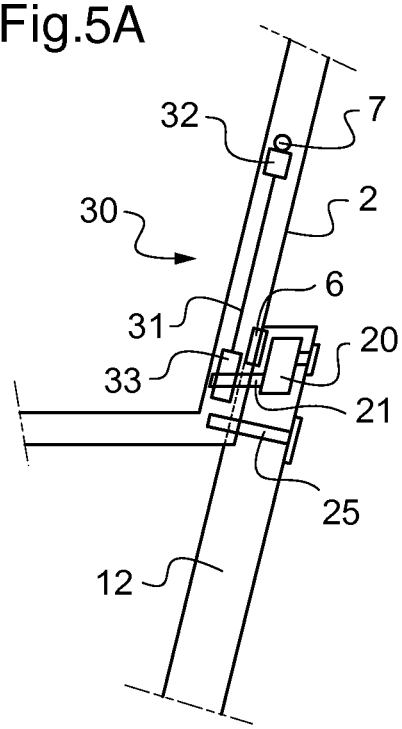
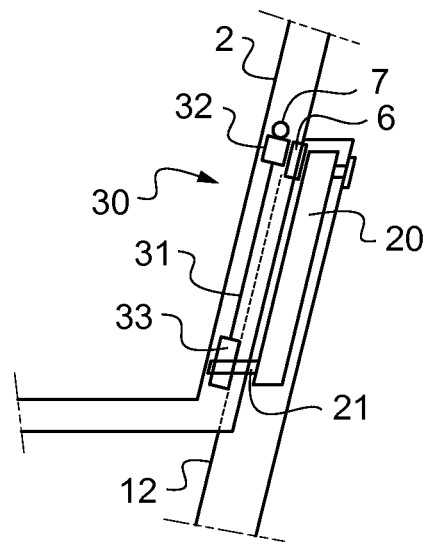
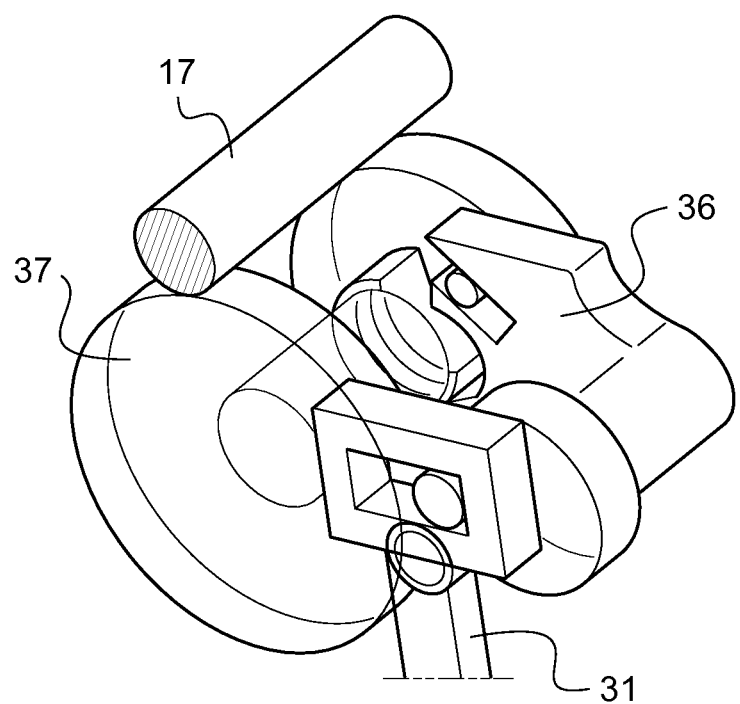

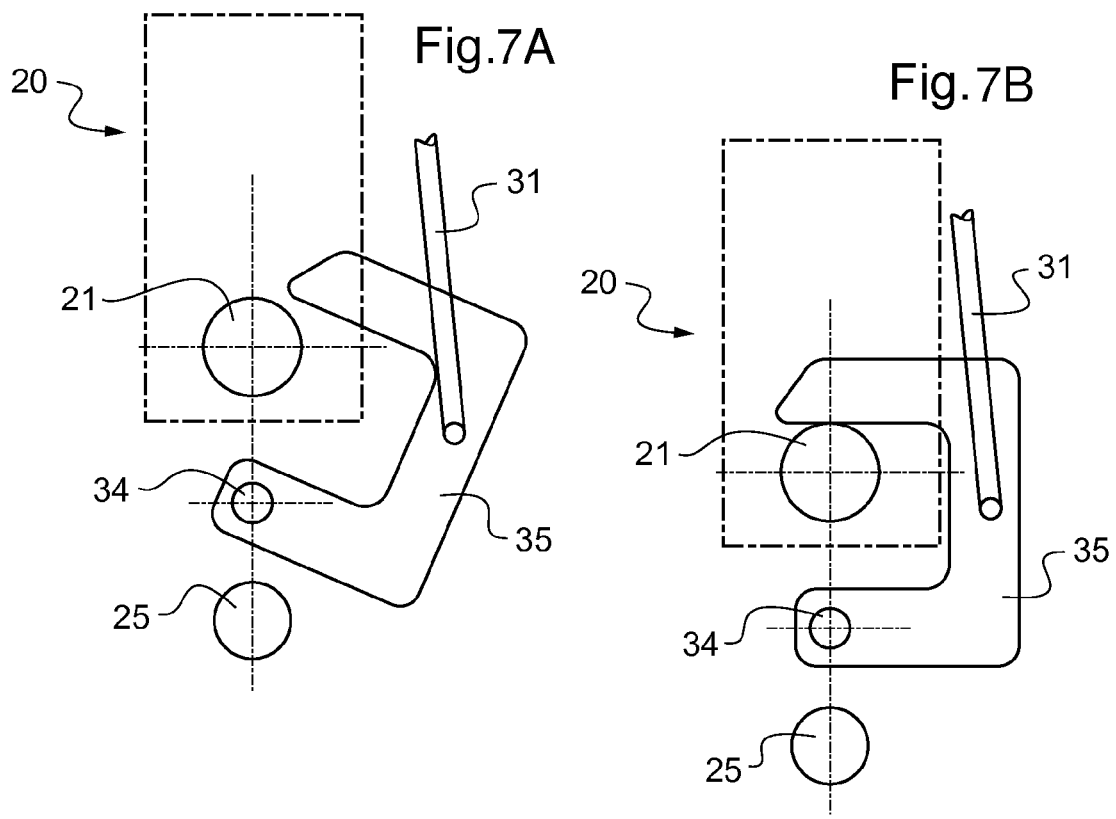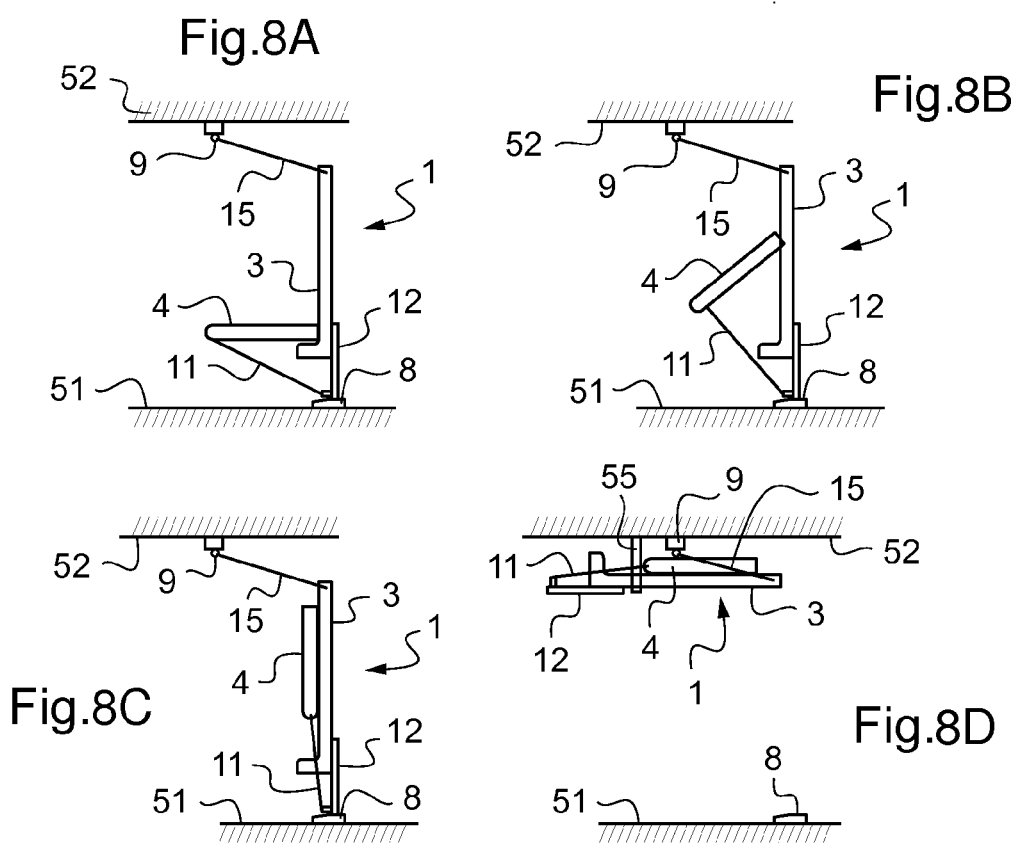

AIRCRAFT BENCH PROVIDED WITH CRASH-PROTECTION MEANS

CROSS REFERENCE TO RELATED APPLICATIONS

This application claims priority to French patent application No. FR 12 00616 filed on Mar. 1, 2012, the disclosure of which is incorporated in its entirety by reference herein.

BACKGROUND OF THE INVENTION (1) Field of the Invention

The present invention relates to the field of aircraft seats. It provides a bench having a plurality of seats for passengers of the aircraft.

(2) Description of Related Art

The bench is capable of withstanding a high level of deceleration to which the aircraft might be subjected, in particular in the event of a rough landing or of a crash, in order to provide the passenger(s) of the bench with protection.

The bench of the invention satisfies the requirements of regulations concerning rotorcraft seats and in particular the crashworthiness requirements.

Conventionally, aircraft seats or benches incorporate means for protecting the passenger(s) sitting on the seat or bench in the event of a crash. The term "passenger" is used to designate any person being transported on board the aircraft. Such protection means are commonly constituted firstly by the structure of the seat or bench, and secondly by one or more energy absorber devices.

Energy absorber devices are suitable for dissipating a fraction of the energy to which the seat or the bench is subjected in the event of a violent impact and/or a high level of deceleration, in particular during a crash. As a result, less energy is transmitted to the structure of the seat, and consequently to the passenger. The structure of the seat or bench is thus organized to absorb the stresses and limit the deformations induced by that energy and also to compensate for the deformation of the aircraft floor during a crash.

In a known embodiment, a seat has a leg assembly or "stand" and a "bucket" seat, itself comprising a seat proper and a back. The stand is anchored to the floor of the aircraft via four connection points and constitutes the structure of the seat to which the bucket is fastened.

With a bench, it is possible in the same manner to make use of a stand that is anchored via four connection points to the floor and on which there is fastened an assembly comprising a plurality of bucket seats. However, the bucket seats need to be connected rigidly to one another or else to the structure of the bench so as to be capable in particular of withstanding the stresses of a crash. The stand, constituting the structure of the bench, may be reinforced in order to provide such strength. By way of example, the bench may also have additional connection points with a vertical partition of the cabin of the aircraft.

Furthermore, document US 2006/0237586 describes a bench for a space vehicle. That bench is fastened to a frame that is connected via several connection points to the floor, to the ceiling, and to a vertical partition of the vehicle by means of bars. The tension in the bars is adjustable so as to enable the bench to have the same behavior and to provide the same protection in the event of an impact and regardless of its loading. The loading of the bench means the number and distribution of passengers on the bench together with their weights and sizes.

Also known is document EP 0 065 982, which describes a crashworthy seat for helicopters that includes an energy absorber device. The seat is secured to a support connected to a frame fastened to the floor of the helicopter. When the helicopter is subjected to a high level of deceleration, e.g. associated with a crash, the support moves relative to the frame by means of the energy absorber device. That device is made up, amongst other things, of wires that deform under the action of bending means. It is adjustable in order to adapt to the weight of the passenger of the seat, by modifying the number of wires that are deformed by the bending means.

Furthermore, document EP 0 099 677 describes an individual aircraft seat comprising a bucket seat having a back and a seat proper, a frame, vertical adjustment means, and a device for absorbing energy in the event of an impact. The frame comprises two parallel tubes and two pairs of collars connecting the tubes to the bucket seat. Each tube is connected to the floor of the aircraft via a pivot connection and to the ceiling of the aircraft either directly via a pivot connection or else via a connecting rod and pivot connections.

Also known is document U.S. Pat. No. 6,152,401, which describes a foldable aircraft seat having a back, a seat proper that can be folded relative to the back, a frame, and at least one device for absorbing energy in the event of an impact. The frame has two parallel tubes connected to the back and each comprising two telescopic tubes. Each telescopic tube enables the frame to be connected respectively to the floor of the aircraft via a pivot connection and to the ceiling of the aircraft via a transverse tube and two pivot connections.

Furthermore, document DE 10 2007/011962 describes an aircraft seat having a seat proper and a frame including two vertical retention elements. Each vertical element is fastened to the floor and to the ceiling of the aircraft and supports the seat proper via two belts.

In addition, document FR 2 389 045 describes an energy absorber device and seats including at least one such energy absorber device. For example, a seat has a first energy absorber device fastened to the back of the seat and connected by a cable to the ceiling of the aircraft, and also a second energy absorber device fastened to the seat proper of the seat and to the floor of the aircraft. Another seat has a first energy absorber device fastened to the frame of the seat and connected to its seat proper together with a second energy absorber device fastened to the seat proper and to the floor of the aircraft.

Finally, document FR 2 962 714 describes a foldable aircraft seat having a back and a movable seat proper together with a frame. The frame includes a vertical portion in which the seat proper and the back are stored. The seat proper and the back are movable relative to the frame, both in rotation and in translation, with two pairs of connecting rods connecting the seat proper with the back and also connecting the seat proper with the frame.

As mentioned above, a seat and a bench may have architecture of the same type, with a stand constituting the structure of the seat or the bench, and having one or more bucket seats fastened thereto. The discussion below begins by being restricted to a seat, but the conclusions are substantially identical for a bench.

During a crash, a seat must be structured to absorb the energy resulting from the high level of deceleration of the aircraft and to compensate for deformation of the cabin floor and of the seat and also to compensate for the stresses to which the seat is subjected.

Firstly, the deformation of the floor is a function of the direction and the magnitude of the impact to which the aircraft is subjected. Such deformation can therefore be determined accurately for particular circumstances involving well-defined crashes.

However, in practice, the way a crash happens is not well-defined and might lead to any deformation of the aircraft floor. The stand of the seat must therefore be structured to compensate for such deformation of the floor in order to limit the effect it has on the structure of the seat. The deformation of the floor leads to deformation between the connections of the stand on the floor, thereby stressing the stand as a whole. The effects of such stresses on the passenger of the seat still need to be limited.

Consequently, the stand of the seat is dimensioned to take account of the deformation of the floor and of the internal stresses on the seat that result therefrom during a crash of any kind. As a result, the stand of the seat is of large dimensions and constitutes a major fraction of the weight of the seat.

Furthermore, since the aircraft is subjected to a sudden and strong deceleration, the seat needs to be organized to preserve the passenger. An energy absorber device may be incorporated in the seat in order to dissipate a fraction of the energy that results from this deceleration. By way of example, the device may be interposed between the stand and the bucket seat, with the bucket seat being capable of sliding relative to the stand beyond a certain level of force corresponding to a certain level of deceleration.

Such an energy absorber device is described in document FR 2 930 613, with document FR 2 930 520 describing a seat fitted with such a device.

Such a device generally includes deformable holder means such that the bucket seat is held firmly in a normal use situation. In the event of a crash, the strong deceleration to which the aircraft is subjected causes the holder means to be deformed and thus leads to the bucket seat sliding downwards relative to the stand. As a result, the fraction of the energy to which the seat is subjected during the crash is dissipated in deforming the holder means. The energy absorber device is then said to have been deployed, meaning that those holder means have been deformed during a crash.

Furthermore, there are additional requirements that need to be taken into account when designing and selecting a seat.

Firstly, the size of the seat should be reduced to a minimum in order to make it easier to install in the cabin of the aircraft, in particular in order to optimize the number of seats that can be installed in the cabin. Furthermore, reducing this size serves to limit inconvenience for passengers sitting on neighboring seats, in particular by leaving room for passing the feet of the passenger situated immediately behind the seat in question. On this topic, the stand of a seat with four connection points is very penalizing.

Furthermore, small seat size also makes it easier to arrange spaces in the cabin for moving about and for storage. The space occupied by the seat remains considerable even when it is not in use, thereby leading to wasted space in the cabin. Solutions exist for folding the seat proper up against the back in order to release some space, but the stand continues to be penalizing, since the floor area it occupies remains unchanged.

Finally, the structure of the seat needs to be as simple as possible in order to limit its weight and the cost of fabricating it. In addition, low weight also makes the seat easier to handle when changing the seat layout in a cabin.

A seat that complies with regulations nowadays has a weight of more than 10 kilograms (kg) and recent developments do not make it possible to obtain a weight of less than 10 kg. For a bench, an equivalent weight is obtained depending on the number of seats, i.e. more than 10 kg per seat.

BRIEF SUMMARY OF THE INVENTION

An object of the present invention is thus to provide an aircraft bench capable of satisfying the requirements of regulations while escaping from the above-mentioned limitations, in particular in terms of space occupancy and weight.

In the invention, a crashworthy bench for an aircraft comprises a frame, at least one seat for a passenger, each seat comprising a seat proper, a back, and a retaining system for retaining the passenger, all fastened to the frame, and at least one energy absorber device for each seat.

The term "passenger" is used to designate any person transported on board the aircraft. It can be understood that the term "seat" is used to mean a space on the bench on which only one passenger can sit. A retaining system is a system serving to hold the passenger on the seat.

The aircraft has a cabin that includes at least a floor and walls, the walls comprising at least a ceiling and a plurality of vertical partitions. The term "vertical partition" is used to designate any wall that is arranged substantially vertically between the floor and the ceiling of the cabin.

The device of the invention is remarkable in that the frame of the bench is suitable for being fastened inside the cabin via a single low connection point on the floor for each seat, and via at least one high connection point on a wall of the cabin for the bench as a whole.

The connection points conventionally used for anchoring the stand of a seat or a bench to the floor can be replaced by the connection points of the bench of the invention.

Advantageously, the bench of the invention therefore has only one low connection point on the floor of the aircraft cabin for each seat. The bench preferably has at least two seats. Consequently it has at least two low connection points on the floor, which points are thus located on a common line regardless of the number of seats of the bench. A rail may be arranged in the floor of the cabin to receive these low connection points and to reinforce the floor locally.

Consequently, and unlike the stand of a conventional seat having four connection points generally positioned on two different rails, the deformation to which the floor is subjected during a crash does not generate any deformation between the low connection points of the bench of the invention. No stress associated directly with this deformation of the floor is transmitted to the frame of the bench. Consequently, since it is subjected to less stress, the frame may be simplified, thereby obtaining a saving in weight, in particular.

Furthermore, when deformation of the floor has direct effects on the stand of a seat, an equivalent deformation of the stand needs to be included when performing acceptance tests on the seat. Consequently, this deformation included in such testing often leads to the structure of the seat being overdimensioned, with this problem not occurring for a bench of the invention. The frame of the bench can thus be optimized and consequently its weight can be reduced.

Furthermore, acceptance testing of a bench of the invention is also simplified since it does not need to include any deformation of the frame. The cost of such testing is thus also reduced.

In addition to these low connection points, the bench of the invention includes at least one high connection point, regardless of the number of seats of the bench. Each high connection point contributes to the ability of the bench to withstand a crash.

Each high connection point is situated on a wall of the cabin, i.e. it is not situated on the floor. Preferably, each high connection point is situated in a top zone of the cabin.

In a preferred embodiment of the invention, each high connection point is situated on the ceiling of the cabin. This configuration enables a plurality of benches to be positioned behind one another or facing each other in the aircraft cabin.

In a variant of this embodiment, each high connection point is on a substantially vertical partition of the cabin.

For example, each high connection point is on a vertical partition positioned behind the back of the bench. Under such circumstances, each high connection point is positioned behind the front face of the back of the bench.

The bench of the invention preferably includes two high connection points, which may be on the same wall or on two different walls. For example, each high connection point may be on a vertical side wall, with the two high connection points being on two opposite walls located on either side of the bench. Once more, a plurality of benches may be positioned behind one another or facing each other.

Unlike a traditional seat, in which connection points are located exclusively on the floor, the bench of the invention is connected both in a low zone and in a high zone relative to the bench, i.e. on opposite sides of the zone in which passengers sit. This configuration is favorable for good behavior of the bench during a crash.

During a crash and the high level of deceleration associated therewith, the inertia of the passengers stresses the frame of the bench. The frame of a conventional seat needs to be very rigid so that that stress in the back is taken up by the connection points of the stand anchored to the floor. Each high connection point of the bench of the invention enables these stresses on the back to be taken up more closely. As a result, the frame of the bench can be optimized in order to reduce its stiffness, and consequently to reduce its weight.

Furthermore, each high connection point also serves to reduce the deformation of the back, and in particular the top of the back, where such deformation can be harmful for the safety of passengers, in particular because of the proximity of their heads and because of the decelerations to which they might be subjected.

Thereafter, the bench of the invention is provided with one energy absorber device for each seat it includes. The device serves to dissipate a fraction of the energy to which the bench is subjected during a crash. As a result, the frame of the bench is subjected to lower levels of stress. Consequently, the frame of the bench may be optimized in order to reduce its weight.

For example, the energy absorber device described in document FR 2 930 613 may be used in the bench of the invention.

Finally, using only one low connection point enhances passenger comfort. Passengers situated behind the bench thus have a maximum amount of space available for receiving their feet.

The advantages of the invention compared with a traditional seat are mentioned above. The same advantages apply to a bench.

A traditional bench, e.g. made up of a plurality of bucket seats, generally has a stand that is anchored to the floor via four connection points. The stiffness needed by the bucket seat assembly is obtained either by the structure of the bench or else by adding additional connection points on a partition of the aircraft cabin.

When provided by the structure of the bench, the same advantages are to be found relative to a conventional seat, in particular a saving in the weight of the bench of the invention. When additional connection points are added, the same advantages are to be found compared with a conventional seat. Furthermore, the bench of the invention does not require any additional connection points in order to withstand a crash.

The bench may also include one or more additional characteristics.

Firstly, the frame of the bench possesses two high connecting rods. These high connecting rods are mechanically connected to the frame and suitable for being fastened to at least one high connection point.

In contrast, each high connection point must not lie in a vertical plane containing the connection point between the frame and the high connecting rods with which it is connected. If the high connecting rods were to be positioned vertically, then they would not allow the energy absorber device to deploy in the event of a crash. Such deployment is accompanied by the frame moving downwards, and the high connecting rods would prevent such movement if they were vertical.

Consequently, each high connection point must be located either in front of or else behind a vertical plane passing through the point where the high connecting rod is connected to the frame. Since this vertical plane is not always easy to visualize, each high connection point may be located more simply relative to the back of the bench, given that the points where the high connecting rods are connected to the frame are close to the back. Under such circumstances, and considering that the front face of the back is the face that is in contact with the passengers, each high connection point must be located either in front of or behind the front face of the back of the bench.

This choice of position for each high connection point in front of or behind the front face of the back of the bench may be imposed by how the benches are installed inside the cabin. It may also be related to the size of the high connecting rods. If each high connection point is situated behind the front face of the back of the bench, the high connecting rods will work essentially in traction as the frame moves downwards, after deployment of the energy absorber device and that may be favorable to reducing the weight of the high connecting rods.

Each high connection point may be connected to a high connecting rod via a ball joint, in particular in order to avoid the connecting rod buckling. This connection enables the two high connecting rods to adapt to the movement or to the deformation of the bench. Each high connecting rod may also be connected via a ball joint to the frame of the bench. Each ball joint, firstly between each high connecting rod and each high connection point, and secondly between each high connecting rod and the frame of the bench, may be replaced by a pivot connection in order to increase the rigidity of the bench. Nevertheless, this connection must include at least one degree of freedom in rotation in order to allow the bench to move and deform, in particular in the event of a crash.

Furthermore, the use of a connection having at least one degree of freedom in rotation between the high connecting rods and each high connection point serves to accommodate dispersion in the dimensions between the floor and the wall on which each high connection point is located. The high connecting rods are not vertical and they preferably form an angle of more than 45° with the vertical. As a result, any dimensional variation between the floor and the wall in question will lead to only a small variation in that angle, with the position of the bench accommodating said variations. Likewise, the high connecting rods also serve to absorb any deformations to which each wall might be subjected.

It is also possible to increase the stiffness of the bench, in particular for its static load strength, since that forms one of the tests that the bench of the invention must satisfy, by increasing lateral bearing points between the bench and the walls of the cabin situated on either side of the bench. By adding a lateral bearing point on either side of the bench, e.g.

at the top of the back, with a respective wall of the aircraft cabin, the static strength of the bench is ensured because of the stiffness of the cabin. As a result the stiffness of the frame of the bench may be reduced relative to this static strength requirement.

However, these bearing points must not interfere with the bench moving during a crash, in particular while the energy absorber device is being deployed. Furthermore, the bench must not bear against these walls after such movement, so as to avoid potential deformation of the walls being transmitted to the bench.

Consequently, the frame of the bench possesses two low connecting rods and one leg for each of its seats. These two low connecting rods and the leg are mechanically connected to the frame and are suitable for being fastened to the low connection point on the floor of the cabin of the aircraft.

The two low connecting rods are connected by ball joints firstly to the frame of the bench and secondly to the low connection point. These ball joints serve in particular to avoid the connecting rods buckling. The leg may also be connected by a ball joint to the low connection point. These connections thus enable the two low connecting rods and the leg to adapt to the movement or the deformation of the bench resulting from a crash of the aircraft. Preferably, the bench is connected by a pivot connection to the low connection point.

Each ball joint between the two low connecting rods and either the frame of the bench or the low connection point may be replaced with a pivot connection. Nevertheless, the connection must include at least one degree of freedom of rotation in order to allow the bench to move and deform, in particular during a crash.

In a variant of the invention, only the leg is connected directly to the low connection point, with the two low connecting rods being connected to the leg, close to the low connection point via two ball joints. This variant operates identically to the embodiment in which the low connecting rods and the leg are all connected to the low connection point, and it also makes it possible to simplify installing and removing the bench relative to the floor of the cabin, since only the leg is fastened to the low connection point.

Each leg includes guide means arranged between the leg and the frame. The guide means enable the frame to move relative to the leg, and consequently relative to the cabin of the aircraft. This essentially linear movement is necessary during deployment of the energy absorber device, and also for possible adjustment of the height of the bench, for passenger comfort. These guide means are equivalent to a slideway connection.

Other than in a crash, this movement is prevented by the energy absorber device. In contrast, during a crash, such movement is made possible when a sufficient deceleration level is reached, e.g. of about 30 g, where g is the acceleration due to gravity. At this level of deceleration, the frame, when carrying one or more passengers, exerts sufficient force on each energy absorber device for it to deploy.

In an embodiment of the invention, the energy absorber device is positioned in association with each leg. It has a first end mechanically connected to the leg and it may be associated with the frame via a second end.

The energy absorber device can be used only once. As it deploys, a holder element is plastically deformed in order to dissipate a fraction of the energy of the crash. It is therefore advantageous for the device not to be deployed for a seat of the bench on which no passenger is sitting.

The bench then has activation means for each of the energy absorber devices. Each activation means enables the second end of the device to be mechanically associated with the frame for each seat of the bench that is occupied by a passenger, given that the first end of the device is connected to the leg.

In order to keep the bench in place when the energy absorber device is not activated, i.e. when it is not associated with the frame, fuse means serve to provide the connection between the leg and the frame for each seat of the bench. The fuse means may be permanent, i.e. the connection is provided regardless of whether the energy absorber device is or is not activated. Alternatively, the fuse means may be intermittent, i.e. the connection between the leg and the frame is provided only when the energy absorber device is not activated. In order to simplify the mechanism of the bench and thus avoid making the bench heavier, it is preferred to use permanent fuse means.

The force for breaking the fuse means must be well below the force for triggering the energy absorber device so as to avoid disturbing deployment of that device. When the fuse means are permanent, this breaking force is additional to the force for triggering the energy absorber device. However, for seats without a passenger, the inertia that is being subjected to deceleration is much lower than for a seat that is occupied by a passenger, so the force to which the fuse means are subjected during a crash is also lower. Its breaking force must therefore be dimensioned as a function of the inertia of the frame corresponding to a single seat.

In a variant of this embodiment, the height of the frame of the bench may be adjusted for passenger comfort by means of the leg. For example, connecting the first end of the energy absorber device to various different predetermined positions along the leg makes it possible to modify the height of the frame relative to the floor, and thus the height of the seat proper relative to the floor, while the second end of the device remains mechanically associated with the frame. In the event of the bench having permanent fuse means, positioning the fuse means in various different predetermined positions of the leg enables the height of the frame and thus the height of the seat proper to be adjusted.

In another embodiment of the invention, the frame is suitable for being connected to each high connection point via a slideway connection. This embodiment is possible when each high connection point is on a substantially vertical partition of the cabin. Each slideway connection then replaces the two high connecting rods, making it possible to save weight for the bench, and the connection is positioned between the frame of the bench and a partition, preferably via the back of the bench. Each slideway connection allows the frame to move, both when adjusting the height of the frame and during deployment of the energy absorber device.

The bench preferably has two slideway connections and two high connection points.

The arrangement of the bench may have various configurations. For example, the seat proper may be stationary relative to the back. Under such circumstances, the bench occupies a relatively large amount of space in the aircraft cabin when it is not occupied by a passenger.

In another configuration, the frame may be in two portions, with a back frame secured to the back and a seat frame secured to the seat proper. The seat frame is movable relative to the back frame.

Furthermore, in order to reduce the space occupied by the bench, the seat frame may move from a utilization position to a storage position.

The utilization position corresponds to a position enabling a passenger to be seated. In contrast, the storage position enables the volume that is occupied by the bench to be reduced, with the seat frame being pressed against the back.

In order to reach this storage position, the seat frame may for example move by means of at least one slideway that is positioned on the back frame and that is mechanically associated with the seat frame.

Once the seat frame is in the storage position, the bench can be stored against a wall of the cabin. A large amount of floor space can thus be released.

Advantageously, the bench is stored against the ceiling of the cabin after the seat frame has been put into its storage position. Such storage is possible when the bench has high connecting rods. For this purpose, once the seat frame is pressed against the back frame in the storage position, the low connecting rods and the leg of each seat of the bench are released from the corresponding low connection point. Thereafter, the high connecting rods are positioned close to the ceiling, and the bench is pivoted about the connection between the frame and the high connecting rods. The bench assembly can then be fastened to the ceiling by means of a clamp or a strap.

In this embodiment of the invention, each energy absorber device has activation means constituted by a retaining system for each seat of the bench associated with securing means.

For example, the retaining system includes a belt winder and means for locking the belt. On locking the belt, a passenger causes the winder to turn through some variable number of revolutions depending on the passenger's corpulence, this number lying in the range one to eight. The activation means make use of a Geneva drive (or Maltese cross mechanism), made up of a wheel and a cross, which mechanism is coupled to a gear reduction system connected to the winder. The cross of the mechanism must be turned as from the first revolution of the winder, but it must be turned once only, even if the winder performs eight revolutions.

The operation of the Geneva drive is described on the following Internet site:

http://en.wikipedia.org/wiki/Geneva drive

Thereafter, turning of the cross can act on the securing means via transfer means, e.g. constituted by a connecting rod or a link, and consequently activate the energy absorber device. The securing means may comprise a hook secured to the frame and providing a connection with a pin of the device.

The activation means must be reversible, i.e. when the passenger unlocks a belt and winds it onto the winder, the energy absorber device must no longer be mechanically associated with the frame.

In contrast, the activation means must not transmit force to the winder while the energy absorber device is deploying in order to avoid any risk of injuring the passenger by exerting traction on the winder.

In another embodiment of the invention, each energy absorber device has activation means constituted by lowering the seat proper. The energy absorber device is activated when the seat proper is tilted down into a utilization position and it is not activated when the seat proper is tilted up into a storage position.

Finally, the frame of the bench may be made of metal or of composite material.

BRIEF DESCRIPTION OF THE SEVERAL VIEWS OF THE DRAWINGS

The invention and its advantages appear in greater detail from the following description of embodiments given by way of illustration with reference to the accompanying figures, in which:

FIG. 5A shows the behavior of an energy absorber device of the bench before a crash;
FIG. 5B shows the shows the behavior of an energy absorber device of the bench after a crash;
FIG. 6 shows one way of activating the energy absorber device;
FIG. 7A shows the activation means in a first disconnected position;
FIG. 7B shows the activation means in a second disconnected position;
FIG. 8A shows the bench in a utilization position;
FIG. 8B shows the bench in an intermediate position between a utilization position and a storage position;
FIG. 8C shows the bench in a storage position;
and
FIG. 8D shows the bench in another storage position.

Elements that are present in more than one of the figures are given the same references in each of them.

DETAILED DESCRIPTION OF THE INVENTION

Figure 1:
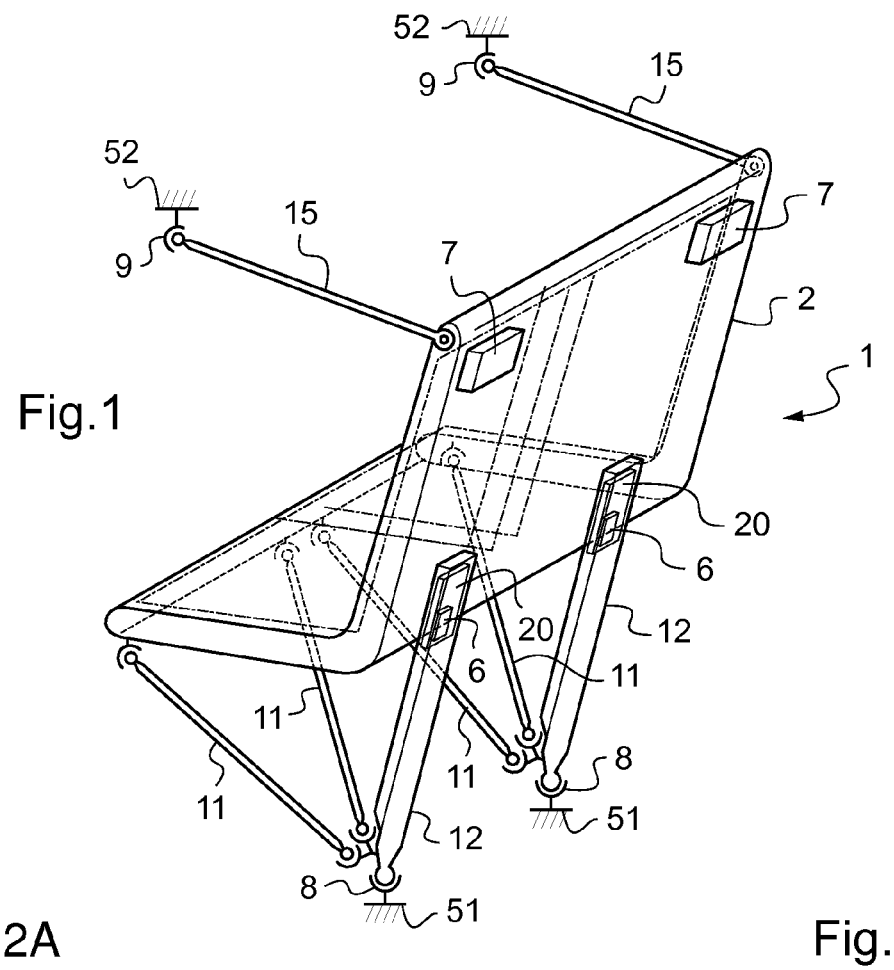
FIG. 1 is a view of the bench.

FIG. 1 shows a bench 1 for installing inside an aircraft cabin and provided with two seats. Each seat, comprising a seat proper and a back, is provided with a passenger retaining system 7 and with an energy absorber device 20. The bench 1 has two connecting rods 15 fastened to two high connection points 9 situated at the ceiling 52 of the cabin, and also two low connecting rods 11 and one leg 12 per seat, all fastened to a low connection point 8 situated on the floor 51 of the cabin.

Each high connecting rod 15 is mechanically connected firstly to a frame 2 of the bench via a pivot connection at the top of the back, and secondly to a high connection point 9 via a ball joint.

Other architectures could be selected, in particular depending on the stiffness of the bench. For example, these connections could be interchanged, i.e. the bench 1 could have a ball joint between each high connecting rod 15 and the frame 2, in association with a pivot connection between each high connecting rod 15 and the corresponding high connection point 9. It is also possible to use ball joints only or to use pivot connections only.

For each seat, the two low connecting rods 11 are connected to the frame 2 via respective ball joints in the front region of the seat proper, and the leg 12 is associated with the frame 2 via guide means 6 in a rear zone of the seat proper. The leg 12 is connected to a low connection point situated on the floor 51 of the cabin via a ball joint. The two low connecting rods 11 are connected to the leg 12 close to the low connection point via respective ball joints.

Figure 4A:
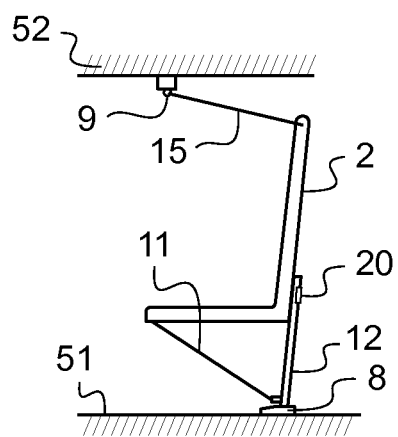
FIG. 4A shows the bench before a crash.
Figure 4B:
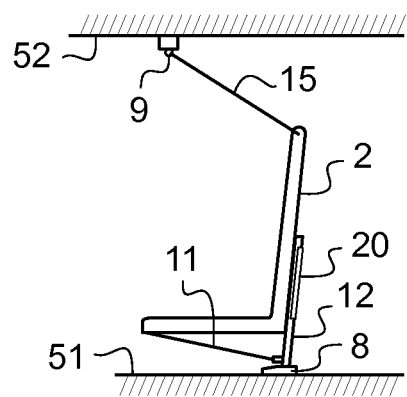
FIG. 4B shows the bench after a crash.

FIGS. 4 and 5 show the operation of the bench 1 and of the energy absorber device 20 during a crash. The bench is shown before a crash in FIG. 4A and after a crash in FIG. 4B, with FIGS. 5A and 5B showing a detail of the energy absorber device 20 respectively before and after a crash.

In FIGS. 4A and 4B, it can be seen that the bench 1 moves downwards during a crash. The energy absorber device 20 has been lengthened, thereby enabling a fraction of the energy of the crash to be dissipated by plastic deformation of a holder member that it contains. The high connecting rods 15 fastened to the top of the back serve to limit deformation of the back, thereby contributing to protecting a passenger of the bench 1.

In FIG. 5A, it can be seen that the energy absorber device 20 is associated with the frame 2 via activation means 30. The activation means 30 comprise the retaining system 7, transfer means 31, a Geneva drive 32, and securing means 33. The operation of the activation means is described in greater detail with reference to FIGS. 6 and 7.

The energy absorber device 20 is fastened via a first end to the leg 12. Its second end 21 may be mechanically associated with the frame 2 by the activation means 30, solely when a passenger is sitting on the corresponding seat of the bench 1. When this second end is not associated with the frame 2, fuse means 25 serve to hold the frame 2 in position relative to the leg 12.

Regardless of whether or not the corresponding seat is occupied, during a crash, the fuse means 25 break as from a determined force that is lower than the threshold for triggering the energy absorber device 20. Thereafter, the energy absorber device 20 deploys as shown in FIG. 5B. The device 20 is lengthened with accompanying movement of the frame 2. This movement takes place along the guide means 6 present between the leg 12 and the frame 2. The guide means 6 provide a slideway connection between the frame 2 and the leg 12.

FIGS. 6 and 7 show details of the operation of the activation means 30. Movement of the transfer means 31 is controlled by the retaining system 7. The retaining system 7 comprises a winder, a belt, and locking means. A passenger winds the winder through one to eight revolutions in order to buckle the seatbelt. The activation means must therefore enable the energy absorber device 20 to be secured to the frame 2 as from the first turn of the winder.

For this purpose, a Geneva drive is used. It comprises a wheel 37 and a cross 36. The wheel 37 is rotated by a toothed wheel 17 that is secured to the winder of the retaining system 7, using a stepdown gear ratio such that the wheel 37 turns through one revolution while the winder turns through eight revolutions. A finger of the wheel 37 co-operates with a slot in the cross 36 so as to turn the cross 36. The cross 36 turns through the same amount regardless of whether the winder turns through one revolution or eight revolutions, with this serving to move the transfer means 31. The transfer means 31 may be constituted by a connecting rod or link, for example.

A hook 35 is movable about a pin 34 secured to the frame 2. A spring (not shown) urges the hook 35 continuously towards a disconnected first position, with movement of the transfer means 31 fastened to the hook 35 serving to turn the hook 35 to a connected second position.

In the connected second position as shown in FIG. 7B, the hook 35 is engaged around a pin constituting the second end 21 of the energy absorber device 20. Downward movement of the frame 2 during a crash then acts via the hook 35 to move the second end 21 of the energy absorber device 20, and consequently to deform the holder element it contains.

In the disconnected first position shown in FIG. 7A, the hook 35 releases the pin constituting the second end 21 of the energy absorber device 20, so that movement of the frame 2 is then independent of the device 20.

FIG. 2 shows various embodiments of the bench 1, in particular by changing the positions of the high connection points 9. In these embodiments, the frame 2 is connected to the low connection point 8 by two low connecting rods 11 and one leg 12 per seat of the bench 1.

Figure 2A:
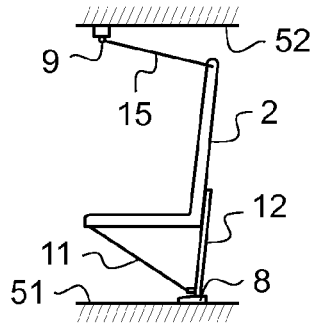
FIG. 2A shows an embodiment of the bench with a high connecting rod.
Figure 2B:
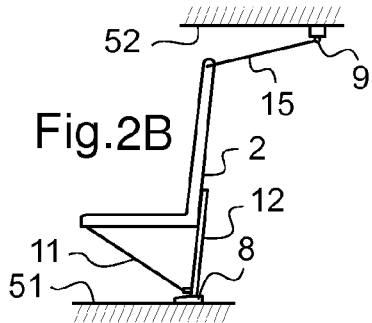
FIG. 2B shows another embodiment of the bench with a high connecting rod.

In FIGS. 2A and 2B, the bench 1 has two high connecting rods 15 connected to high connection points 9 situated at the ceiling 52. These high connection points 9 are respectively located in front of the back of the bench 1 and behind the back of the bench 1.

Figure 2C:
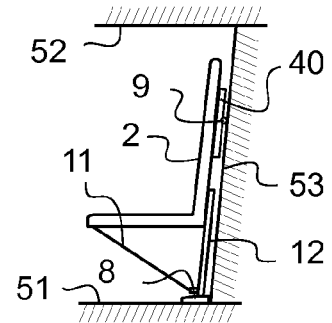
FIG. 2C shows an embodiment of the bench with a slideway connection.
Figure 2D:
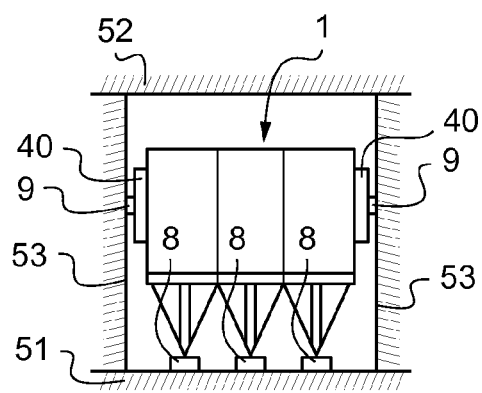
FIG. 2D shows another embodiment of the bench with a slideway connection.

In FIGS. 2C and 2D, the bench 1 has two slideway connections 40 connected to the high connection points 9 as replacements for the high connecting rods 15. These high connection points 9 are situated on vertical partitions 53 of the aircraft cabin. It can be understood that the term "vertical partition" 53 is used to designate any wall that is substantially vertical between the floor 51 and the ceiling 52.

In FIG. 2C, the high connection points 9 are situated on a vertical partition situated behind the bench 1. In FIG. 2D, the high connection points 9 are situated on two vertical partitions positioned on either side of the bench 1.

Figure 3:
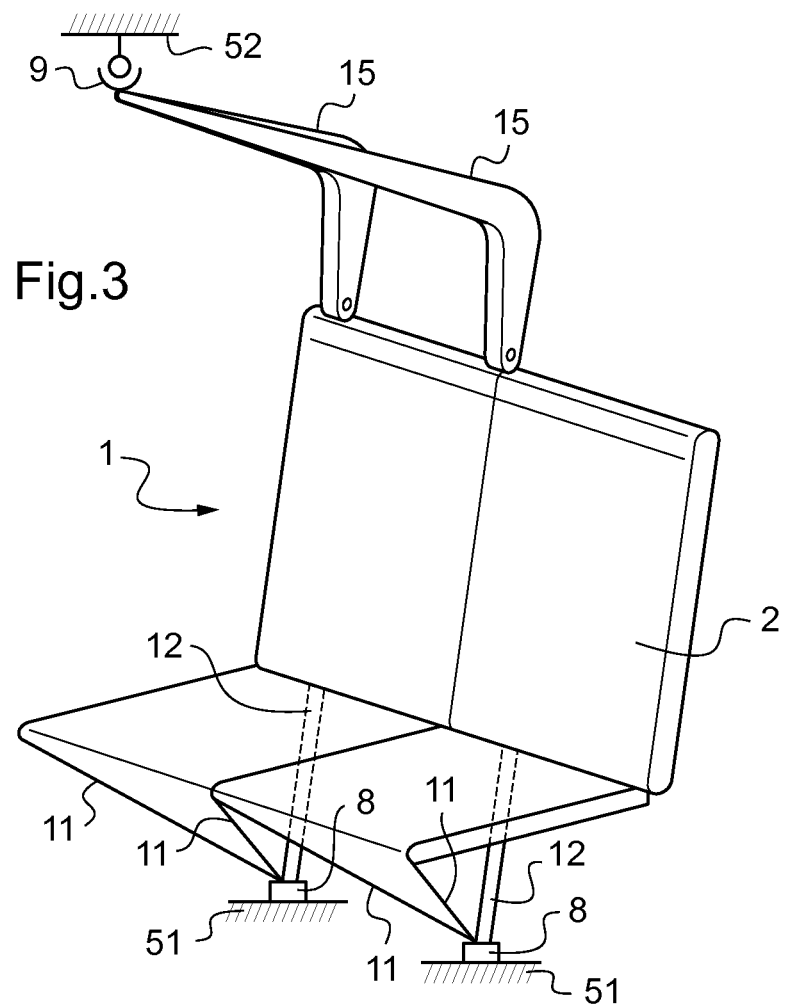
FIG. 3 shows an embodiment of the bench having only one high connection point.

FIG. 3 describes another embodiment of the bench 1 that uses only one high connection point 9. In this embodiment, the two high connecting rods 15 are fastened to a common high connection point 9, while the bench 1 is fastened to the floor 51 in a manner that is identical to the above-described embodiment.

The use of a single high connection point 9 enables the high connecting rods 15 to be positioned so as to release space above the back. This space is advantageous in particular when there is a gangway beside the bench 1, thereby facilitating access to the bench 1 from the gangway.

These various architectures for the bench 1 of the invention should be selected as a function of the way the bench is installed in the aircraft cabin. These architectures may also have an effect on the weight of the bench, in particular as a result of replacing the high connecting rods 15 by slideway connections 40.

FIG. 8 shows a particular embodiment of the bench 1 in which the frame 2 is constituted by a seat frame 4 and by a back frame 3. The seat frame 4 is secured to the seat of the bench 1 and is movable relative to the back frame 3, which is secured to the back of the bench 1. The rear zone of the seat frame 4 is associated via a slideway connection with the back frame 3.

As a result, the seat frame 4 can move into a storage position against the face of the back, as shown in FIG. 8C. This reduces the space occupied by the bench 1 when there is no passenger sitting on it, thereby releasing space in the aircraft cabin and making it easier to store the bench. The bench 1 may be stored against a wall of the cabin so as to release a greater amount of space. In particular, it may be pressed against the ceiling 52, thereby completely releasing the area of the floor 51. It may be held in this position by a clamp or a strap 55 fastened to the ceiling 52.

In this particular embodiment, the activation means 30 may be constituted by a movement of the seat frame 4. The energy absorber device 20 would then be activated only in the event of the seat frame 4 being in the utilization position, i.e. in the position it occupies when a passenger can sit on it.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A crashworthy bench for an aircraft having a cabin including at least a floor and walls of the cabin, the walls of the cabin including at least a ceiling and a plurality of substantially vertical partitions, the bench comprising:
a frame;
at least one seat for a passenger, each seat comprising a seat proper, a back, and a retaining system for retaining the passenger, all fastened to the frame; and
at least one energy absorber device for the at least one seat;
wherein the frame is suitable for being fastened to the inside of the cabin via a single low connection point on the floor for each seat via two low connecting rods and one leg for each seat, the low connecting rods mechanically connected to the frame at a front region of the seat proper and the leg being mechanically connected to the frame, the low connecting rods extending inwardly towards one another from the frame to the low connection point, and by at least one high connection point for the bench on at least one of the walls of the cabin via two high connecting rods, the high connecting rods being fastened to the at least one high connection point and being mechanically connected to the frame; and
wherein the energy absorber device is mechanically associated at a first end with the leg and at a second end with the frame.

2. The bench according to claim 1, wherein the high connecting rods are fastened to the at least one high connection point by connections possessing at least one degree of freedom in rotation, each high connection point being positioned behind the back.

3. The bench according to claim 1, wherein the high connecting rods are being fastened to the at least one high connection point by connections possessing at least one degree of freedom in rotation, each high connection point being positioned in front of the back.

4. The bench according to claim 1, wherein the frame is suitable for being connected to each high connection point via a slideway connection.

5. The bench according to claim 1, wherein each high connection point is a substantially vertical partition.

6. The bench according to claim 1, wherein each high connection point is on the ceiling.

7. The bench according to claim 1, wherein, for each seat of the bench, the bench has fuse means and activation means for activating the energy absorber device, each activation means being capable of providing a mechanical connection between the frame and the energy absorber device of the associated seat, each fuse means being capable of providing a mechanical connection between the frame and the leg of each seat, the fuse means configured to break at a determined force lower than a threshold for triggering the energy absorber device to deploy the energy absorber device.

8. The bench according to claim 7, wherein a frame height is adjustable by positioning each fuse means at a position selected from a plurality of predetermined positions of the leg.

9. The bench according to claim 1, wherein each leg includes guide means enabling the frame to move during deployment of the energy absorber device.

10. The bench according to claim 1, wherein the frame comprises a back frame secured to the back and a seat frame secured to the seat proper, the seat frame being movable relative to the back frame.

11. The bench according to claim 10, wherein the seat frame may be moved from a utilization position to a storage position against the back frame in order to reduce a volume of the bench.

12. The bench according to claim 11, wherein the seat frame may be moved by means of at least one slideway positioned on the back frame in order to place it in the storage position.

13. The bench according to claim 11, wherein the bench can be stored against one of the walls of the cabin when the seat frame is placed in the storage position.

14. The bench according to claim 11, wherein the bench may be stored against the ceiling when the seat frame is placed in its storage position.

15. The bench according to claim 7, the bench having activation means for activating the energy absorber device, wherein each activation means is constituted by the retaining system for a seat of the bench and by securing means.

16. The bench according to claim 11, the bench having activating means for activating the energy absorber device, wherein each activation means is constituted by movement of the seat frame of a seat of the bench.

17. A crashworthy bench for an aircraft having a cabin including at least a floor and walls of the cabin, the walls of the cabin including at least a ceiling and a plurality of substantially vertical partitions, the bench comprising:
a frame;
at least one passenger seat comprising a seat proper, a back, and a retaining system for retaining a passenger, each of the at least one seat being fastened to the frame;
at least one energy absorber device for each of the at least one seat;
a first low connecting rod for each of the at least one seat, the first low connecting rod having a first rod proximal end and a first rod distal end, the first rod proximal end being coupled to the frame;
a second low connecting rod for each of the at least one seat, the second low connecting rod having a second rod proximal end and a second rod distal end, the second rod proximal end being coupled to the frame and spaced from the first rod proximal end;
a leg for each of the at least one seat, the leg having a leg proximal end and a leg distal end, the leg proximal end being coupled to the frame, wherein the leg distal end, first rod distal end, and second rod distal end are directly adjacent to one another and fastenable to the inside of the cabin at a single low connection point on the floor, the first and second low connecting rods extending inwardly towards one another and converging from the frame to the single low connection point; and
two high connecting rods, each high connecting rod being coupled to the frame and being fastenable to a high connection point.

18. A helicopter comprising:
a cabin with a floor and walls, the floor including a low connection point, the walls including a ceiling, a plurality of substantially vertical partitions, and at least one high connection point;
a frame;
at least one passenger seat comprising a seat proper, a back, and a retaining system for retaining a passenger, the seat proper having a front region and a rear zone, the back connected to the seat proper at the rear zone, each of the at least one seat being fastened to the frame at the rear zone;
at least one energy absorber device for each of the at least one seat;

a leg for each of the at least one seat, the leg extending between and coupling the frame and the low connection point of the floor, the leg associated with the frame at the rear zone;
a first low connecting rod for each of the at least one seat, the first low connecting rod extending between and coupling the front region of the seat and the low connection point of the floor through a first ball joint at a low connection point of the leg;
a second low connecting rod for each of the at least one seat, the second low connecting rod being spaced from the first low connecting rod at the front region of the seat, the first and second low connecting rods extending inwardly towards one another and converging at the low connection point of the leg,
the second low connecting rod extending between and coupling the front region of the seat and the low connection point of the floor through a second ball joint at the low connecting point of the leg;
a first high connecting rod coupling the frame and a respective one of the at least one high connection point; and
a second high connecting rod coupling the frame and a respective one of the at least one high connection point.

19. The crashworthy bench of claim 17 wherein the energy absorber device contains a holder member configured to plastically deform to dissipate energy;
wherein a first end of the energy absorber device is fastened to the leg;
wherein a second opposed end of the energy absorber device is mechanically associated with the frame via activation means; and
wherein the frame is held in position relative to the leg via a fuse means, the fuse means configured to break at a determined force lower than a threshold for triggering the energy absorber device to deploy the energy absorber device.

20. The bench according to claim 7, wherein each activation means comprises a Geneva drive.

\* \* \* \* \*